C. H. Stratton.
Excavator.
No. 45,877.  Patented Jan. 10, 1865.
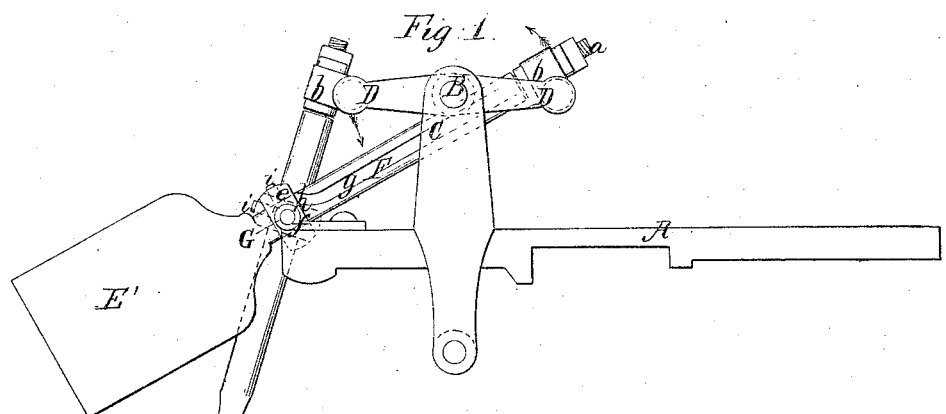
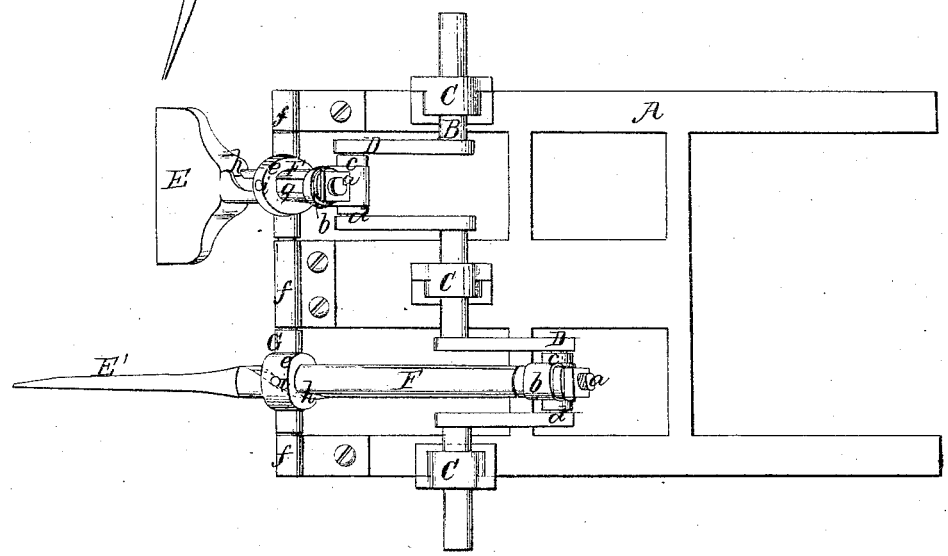

UNITED STATES PATENT OFFICE.

CHARLES H. STRATTON, OF MUNROETOWN, PENNSYLVANIA.

IMPROVED DIGGING-MACHINE.

Specification forming part of Letters Patent No. 45,877, dated January 10, 1865.

*To all whom it may concern:*

Be it known that I, CHARLES H. STRATTON, of Munroetown, in the county of Bradford and State of Pennsylvania, have invented a new and Improved Digging-Machine; and I do hereby declare that the following is a full, clear, and exact description thereof, which will enable those skilled in the art to make and use the same, reference being had to the accompanying drawings, forming part of this specification, in which—

Figure 1 is a side view of my invention; Fig. 2, a plan or top view of the same.

Similar letters of reference indicate corresponding parts.

This invention relates to a new and improved machine for spading the earth, with steam as a motor; and it consists in the employment or use of spades or forks, (any suitable or desired number,) arranged in such a manner that they will, as the machine is drawn along, penetrate the earth and lift and turn over the same, similar to hand-digging, and perform the work equally as well.

A represents a frame of rectangular form, which may be constructed of metal or wood; and B is a shaft placed transversely on said frame and working in bearings C, attached thereto. The shaft B is provided with two cranks, D D, which are in opposite positions relatively with each other, as shown in both figures.

E E' are two spades, which are at the ends of cylindrical shafts F F, the upper ends of the latter being provided with journals *a*, which are fitted in bearings *b*, said bearings being attached to sleeves *c*, fitted loosely on the wrists *d* of the cranks D D. The shafts F F also work in bearings *e* in a shaft, G, on the rear end of the frame A. The spade-shafts are allowed to move freely in the bearings *e*, and the shaft G is allowed to turn freely in its bearings *f* on the frame A. The shafts F F have each a longitudinal slot, *g*, made in them, extending nearly their whole length. The lower ends of these slots *g* are curved, so as to extend around one-half the circumference of the shafts in spiral form, as shown at *h* in both figures.

In the bearings *e e* there are fitted pins *i*, one in each, and these pins pass into the slots *g* of the shafts F F.

The operation is as follows: The frame A is mounted on suitable wheels, and has upon it an engine and an upright boiler, the former being directly connected to the shaft B. The shaft B is rotated in the direction indicated by the arrows in Fig. 1, and the spades E E' have a downward movement communicated to them, which causes them to penetrate the earth. They then rise, or are turned upward with their load to nearly a horizontal position, and are drawn inward until the pins *i* enter the spiral portion *h* of the slots *g*, when they are turned one-quarter of a revolution and the earth cast from them. They are then turned back as they are moved outward and again forced down into the earth, and the same operation repeated. The two spades E E' penetrate the earth alternately, owing to the cranks D D being in reverse positions, one spade penetrating the earth while the earth on the other spade is being cast from it, and vice versa.

I design to have the machine move along with such a rate of speed that one revolution of the crank-shaft B will be made for every six inches of space the machine travels over. I will thus be enabled to use a light machine, as the spades will not be overtaxed with work.

I claim as new and desire to secure by Letters Patent—

1. The employment or use in a steam digging-machine of a series of spades arranged in such a manner as to penetrate the earth, rise or swing upward with their load, and then turn one-quarter of a revolution to discharge the same, substantially as herein shown and described.

2. The slots *g* in the shafts F F, having spiral outer ends, *h*, in connection with pins *i*, fitted in the bearings *e*, and passing into the slots *g*, the shaft G, to which the bearings *e* are attached, and the crank-shaft B, all being arranged to operate the spades E E', as set forth.

CHAS. H. STRATTON.

Witnesses:
LYMAN BLACKMAN,
A. G. CRANNER.